G. H. FAHRENBRUCH.
CAR DOOR.
APPLICATION FILED JUNE 3, 1916.

1,202,276.

Patented Oct. 24, 1916.
3 SHEETS—SHEET 1.

Inventor:
George H. Fahrenbruch,
by Parker Cook Atty.

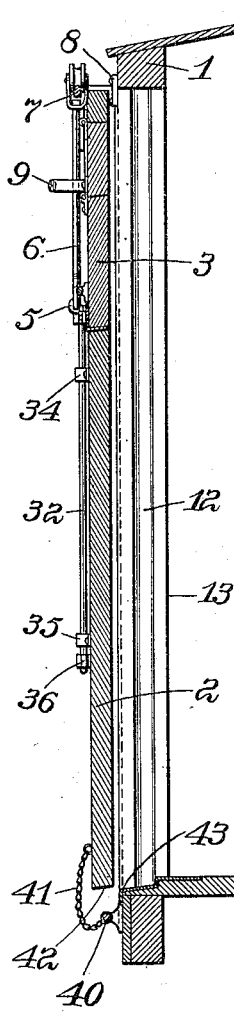
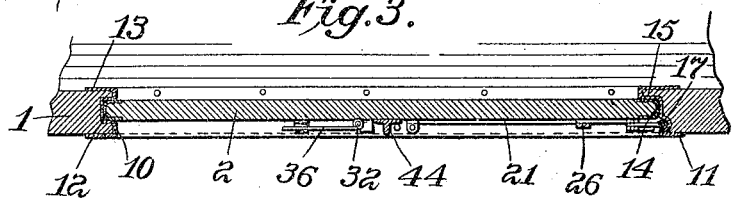
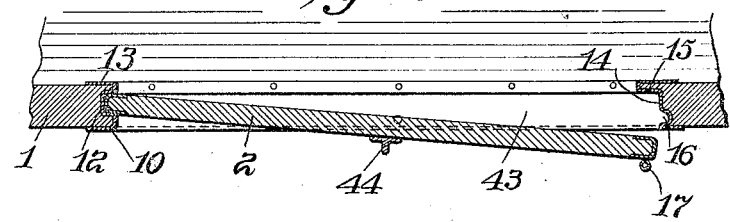
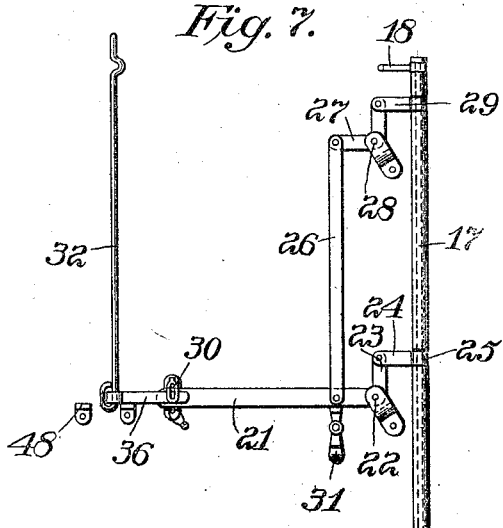
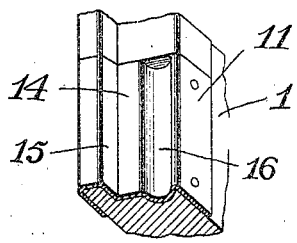

G. H. FAHRENBRUCH.
CAR DOOR.
APPLICATION FILED JUNE 3, 1916.

1,202,276.

Patented Oct. 24, 1916.
3 SHEETS—SHEET 3.

Inventor:
George H. Fahrenbruch,
by Parker Cook
Atty.

UNITED STATES PATENT OFFICE.

GEORGE H. FAHRENBRUCH, OF OMAHA, NEBRASKA.

CAR-DOOR.

1,202,276.   Specification of Letters Patent.   Patented Oct. 24, 1916.

Application filed June 3, 1916. Serial No. 101,519.

*To all whom it may concern:*

Be it known that I, GEORGE H. FAHRENBRUCH, a citizen of the United States, residing at Omaha, in the county of Douglas and State of Nebraska, have invented certain new and useful Improvements in Car-Doors, of which the following is a specification.

My invention relates to a new and useful improvement in car doors and particularly the means for locking the same in its closed position.

An object of my invention it to provide a door and means for locking the same that may be used on a car for carrying general merchandise, as well as a door that is especially adapted to be used when the car is carrying grain.

Another object of my invention is to provide a door and a fastening means thereon wherein the door may be moved slightly outwardly and then moved longitudinally of the car in the same manner as the ordinary door now commonly used on freight cars.

Another object of my invention is to provide a door that when placed in its closed position may be tightly locked in its casing so that no grain will be able to escape either from under the door or around its sides; and by providing a special locking mechanism, that will tightly wedge the door in its closed position and at the same time may be easily released thus permitting the door to be swung slightly outwardly either from the bottom, thus allowing the grain to escape, or when so desired to permit the door to swing outwardly and then be moved to a position away from the open doorway.

Still another object of my invention is to provide a secondary door in the said car door and provide a locking mechanism that is connected to both doors so that both doors may be tightly locked in position when the main locking mechanism is so positioned.

With these and other objects in view my invention consists in certain new and novel constructions and combination of parts as will be hereinafter more fully described and pointed out in the claims.

Figure 1:
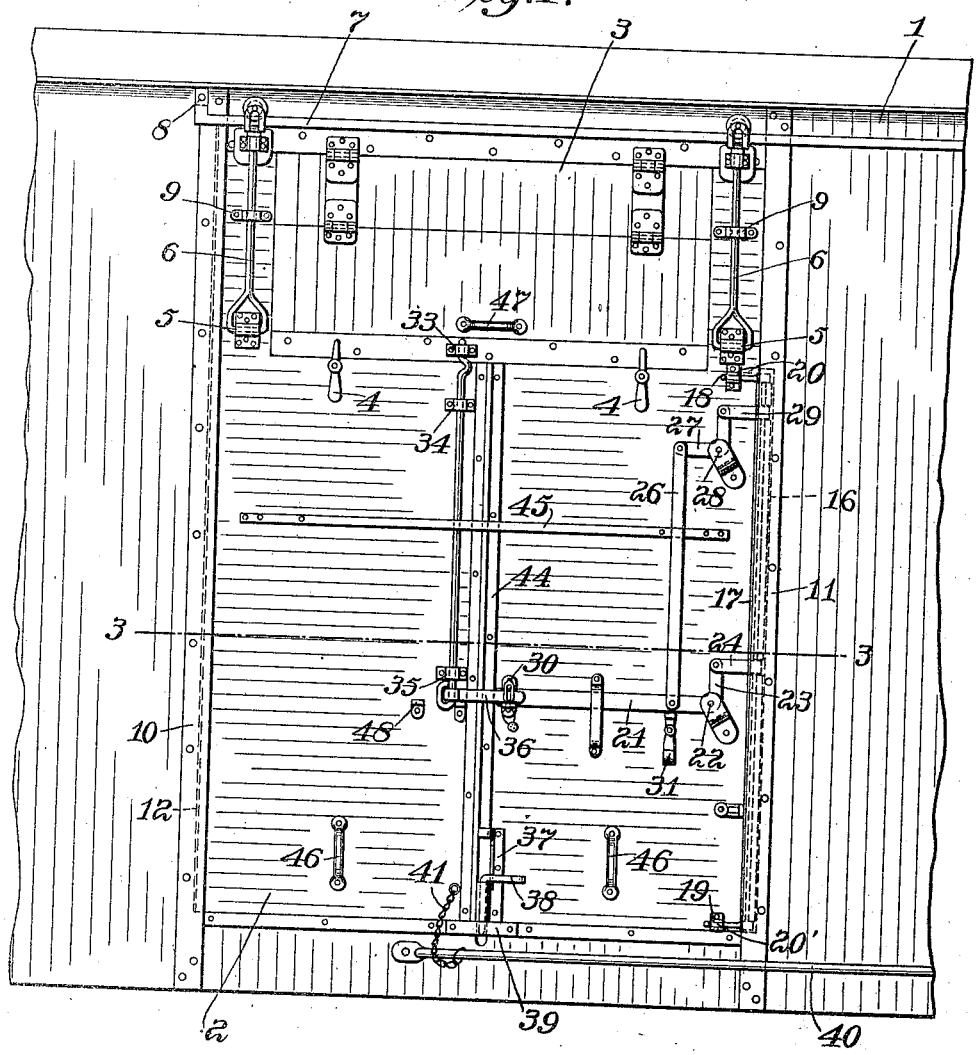
Figure 8:
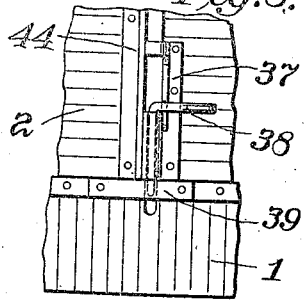
Figure 10:
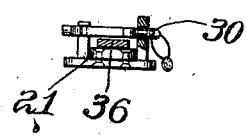
Figure 5:
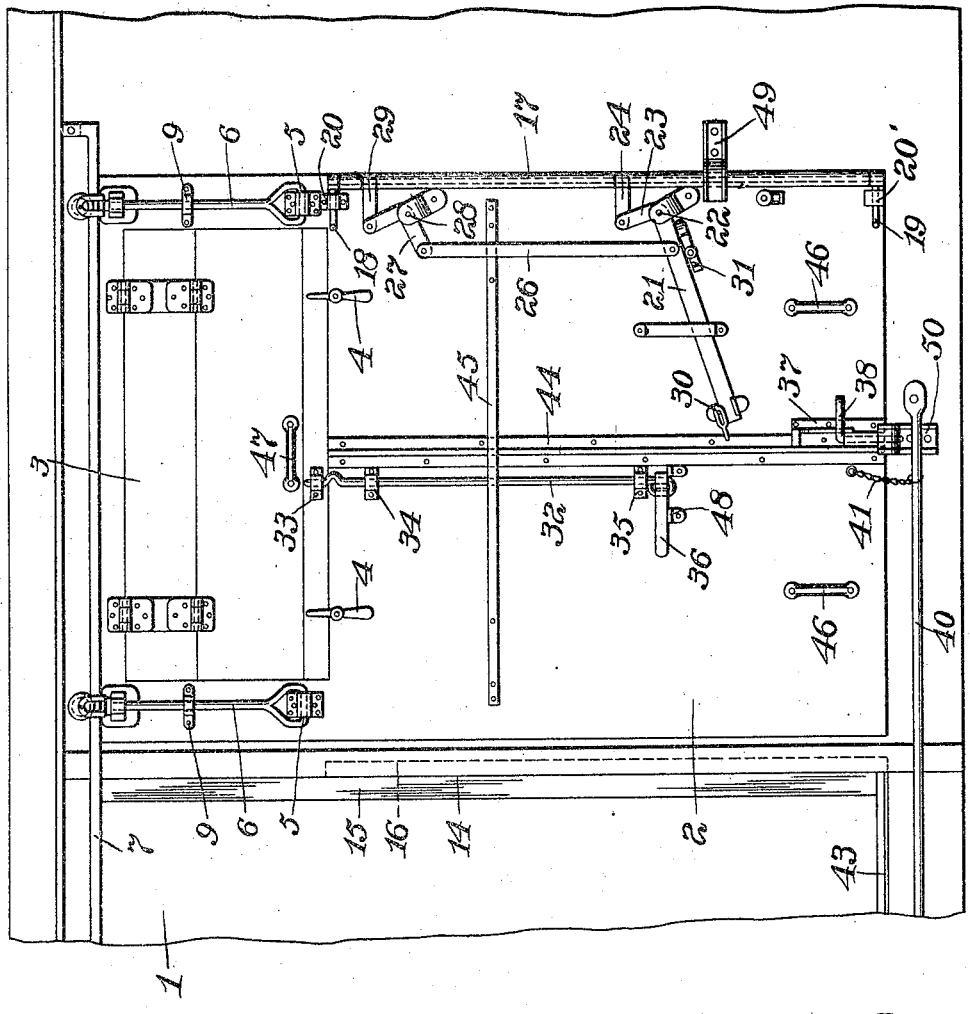
Figure 6:
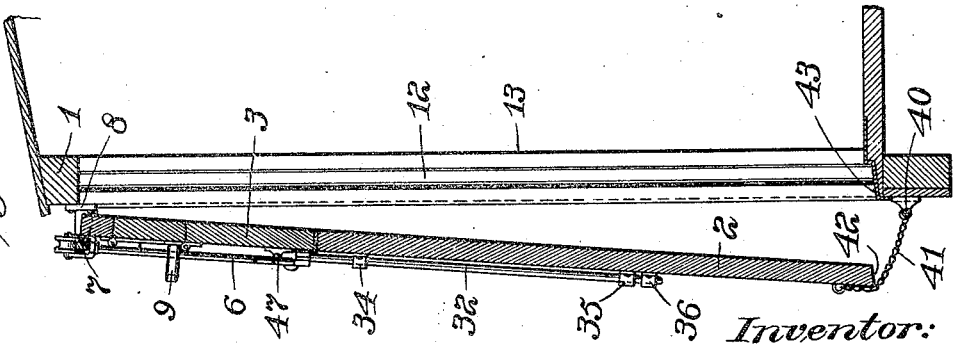

Referring now to the drawings, Figure 1 is a view in elevation of the improved car door and the locking mechanism, and the locking mechanism in this case being in its locked or forward position. Fig. 2 is a vertical central sectional view. Fig. 3 is a sectional view taken on line 3—3 of Fig. 1. Fig. 4 is a similar view but the door in this instance being swung slightly open preparatory to moving the same from within the casing. Fig. 5 is a view similar to Fig. 1, the door in this instance however being pushed back from the door opening and the locking mechanism in its released position. Fig. 6 is a vertical section and showing the door in a position for releasing the grain. Fig. 7 is a partial detail view of the improved locking mechanism. Fig. 8 is a detail view of the central locking pin. Fig. 9 is a broken view of one of the stiles with the grooves for the reception of the roller, and Fig. 10 is a detail of the seal latch member.

Referring now to Fig. 1, a part of an ordinary freight car 1 of the box car type is shown in which is positioned the improved door 2 which door is provided with an upper door 3, at or near the top thereof. This door 3 is very common to grain car doors and is used only when loading grain into the said car. Fasteners 4 are shown in the form of turn buttons to hold the said door 3 in place when the car is full of grain or in fact any other commodities.

Referring now to the main door 2 it will be seen that pivoted near the top thereof and at the sides of the door 3 are the bearings 5 in which are positioned the hanger rods 6 which in turn have rollers traveling on the supporting rod 7 which is fastened to the car 1 at one side of the door opening as at 8 and extends for a distance about twice the width of the door or opening, so that the said door 2 may be swung out of the opening and moved to a position to entirely clear the said opening. These hanger rods 6 are limited in their movement transverse to the door by the stops 9, but the rods are pivoted at the bearings 5 so that the door may swing inwardly and outwardly with relation to the car, as well as forwardly and rearwardly by being hung to the supporting bar 7.

Referring now for the moment to Figs. 3 and 4 it will be seen that the stiles 10 and 11 are provided with certain grooves, stile 10 having a central portion cutout as at 12 and preferably reinforced by a metal strip 13 while the stile 11 has a central and forward portion as 14 removed so as to leave a flange 15 at the rearward portion thereof, and so that the door may be swung at an angle as clearly shown in Fig. 4. A further groove 16 is formed in the said stile 11 for a distance from the bottom of the door to a point near the lower end of the said upper door 3, for the reception of a roller to be hereinafter described.

Referring now to the locking mechanism which forms a principal part of my invention and specifically shown in Fig. 7 it will be seen that there is a vertical roller 17 that is adapted when forced to its locking position to fit tightly within the groove 16 before mentioned in the stile 11. This roller may be of any suitable material and of course of a diameter that will form a tight fit within the groove 16 and the rear portion of the roller must fit tightly against the door 2 to force the same tightly against the rearmost flange 15. This roller 17 is guided in its movement by two rods 18 and 19 which fit in the bearings 20 and 20', the said bearings being respectively near the upper portion of the door and near the lower portion thereof. A main locking lever 21 is pivoted as at 22 having an upturned arm 23 thereon which in turn is pivoted to the arm 24 which loosely encircles the roller 17 as at 25.

In the drawings I have shown the roller 17 as having an internal rod therethrough on which the roller sections turn, and it will be understood that any preferable form of roller that may turn within the arm 24 may be used. Also pivoted to the main locking lever 21 is a vertical arm 26 which is pivoted to a bell crank lever 27 which lever is pivoted to the door as at 28 and the other end of the said lever 27 is pivoted to the lever 29 which encircles the roller at its upper portion similar to the lever 24.

At the rear end of the lever 21 is a seal latch 30 which may be of any desirable form in which the rear end of the lever 21 may be positioned and as in the ordinary practice a seal is placed at the bottom thereof to show when the door is locked or sealed.

Beneath the main lever 21 and preferably beneath the vertical lever 26 is a turn button 31 which when in its locked position will always hold the main lever 21 in a horizontal position and when this main lever 21 is in this position it means that the roller 17 is always in its outward or locked position, that is, forced tightly within the groove 16 when the said door is in place. Extending downwardly from the top door is a further locking rod 32, the upper end of which is designed to fit within the eyelet 33 on the upper door, said lever being held in position by the eyelets or housings 34 and 35. Rotatably secured to the lower portion of this rod 32 is the arm 36 which arm is also designed to fit within the seal latch 30 heretofore referred to. When the arm 36 is sealed within this latch 30 it is in a straight line with the lever 21 and also signifies that the upper door is tightly locked as well as the main grain door 2.

Secured to the lower central portion of the main door 2 is a casing 37 in which slides the pin 38, the lower end of which is designed to pass within a reinforced opening in the bottom rail 39, and as shown in the drawings an opening extends at right angles to this opening in the bottom rail to permit the grain to run out so that the locking pin 38 may always be forced down into the said opening. A rod 40 is shown also fastened beneath the bottom rail and extends rearwardly for some distance so that a chain 41 may be secured thereto and secured to the said car door 2, so that the door may be limited in its outward movement, at the bottom so that when the door is opened to permit the release of the grain it will not swing too far outwardly but will thus restrict the flow of the grain.

The bottom edge of the door as shown in Fig. 2 may be beveled as at 42, and the bottom rail may be also beveled as at 43 to form a tight fit at the bottom of the said door.

The bottom rail, the grooves in both stiles 10 and 11, as well as the door may be reinforced with metal strips, or in any preferable manner and the door itself may be reinforced as shown in the drawings with the vertical extending angle 44, and by the metal strip 45 and at any other places found necessary or desirable. Two handles 46 are shown at the lower portion of the main door 2, so that the door may be readily swung outwardly, first from the right hand side of the door and then outwardly and rearwardly if so desired. A handle 47 is also provided in the upper door 3. The rearward movement of the door is limited by the stop 49 and the door may be held in this position by pressing the pin 38 in the casting 50 located at the end of the rod 40.

The operation of the door and the locking mechanism is as follows:—Supposing that the door is locked as shown in Fig. 1, and it is desired to fill the car with grain. The seal latch at 30 is broken and the arm 36 is swung outwardly and then pulled down slightly so that the arm 36 is below the seat 48. This pulls the rod 32 downwardly and the upper end out of the eyelet 33. The turn buttons 4 may then be revolved and the handle 47 grasped, and the door swung upwardly. Grain may now be deposited through the opening until the car is full. The arm 36 is then moved from below the seat 48, and again rotated and placed within the seal latch 30. Supposing now it is desired to open the main door 3 to permit the release of the grain from the bottom thereof. The seal latch at 30 is removed and the arm 36 swung over but it is not necessary to rotate the turn buttons 4 as it is not desired in this instance to open the upper door. The turn button 31 is then rotated or unlocked and the main lever 21 then forced downwardly which withdraws the roller from the groove 16 by the operation of the lever 24, and also by lowering the lever 21 it pulls the lever 26 downwardly which also pulls the lever 29 inwardly, which works in conjunction with the lever 24 in forcing the roller backwardly which is guided by the rods 18 and 19 in the bearings 20 and 20'. The pin 38 may be released from the opening in the bottom rail either at this time or before the removal of the lever 21 from the seal latch. The door is then grasped by the handles 46 and swung slightly out at one side as clearly shown in Fig. 4. It may then be swung or moved a short distance farther as shown in Fig. 2 and the weight of the grain or the pressure will force the bottom outwardly as shown in Fig. 6. The outward limit of the lower portion of the door being restricted by the chain 42 and the upward limit of the door restricted by the straps 9 around the hangers 6.

After the grain has ceased to flow from the car, then the door may be moved bodily rearwardly as it is clear of the sills and bottom rail, and will travel on the supporting bar 7, and may then be held in a locked position. Then if now it is desired to again close the door, the door is moved forwardly until it is in front of the opening, the left side of the door is then swung within the groove in the stile 10 and again assumes the position as shown in Fig. 4, the right side of the door is then forced inwardly at the right hand side as shown in Fig. 3. The pin 38 is then forced downwardly within the opening, the main lever 21 is again forced upwardly assuming a horizontal position with that of the door which in turn forces the roller 17 tightly within the groove 16, the turn button 31 is forced tightly up against the lower portion of the rod 21 securely locking the roller 17 in place, and the lever 36 is also swung over within the sealed latch with the lever 21 forming a straight line with the lever 21 and both are held in this position in the seal latch 30. The door is now again tightly locked in position, the roller 17 fitting against one edge of the groove 16 and against the outer surface of the door thereby jamming the said door up against the flange 15 and against the beveled portion 43 in the bottom rail as well as against the grooved portion 12 in the stile 10.

It is to be understood that the small door in the top of the main door is for grain loading only and should be sealed in all cases with the sealed latch to the main lever, as when this is done both doors are tightly locked in position. It is also desirable to keep the main door locked between the posts or stiles at all times when in motion either when loaded or empty so that the same will not become damaged.

With the above construction it will be noticed that the door is a very simple one, that the locking and releasing means are positive in action, and that the door may be readily and quickly swung from its open to closed position and vice versa.

As shown in Figs. 1 and 6 the upper door may be made in two portions if so desired. Many minor changes may be made without departing from the spirit and scope of the invention and it is to be understood that in the present description and drawings I have shown only the preferable form.

Having thus described my invention what I claim as new and desire to secure by Letters Patent is:—

1. In combination with a door frame having stiles both of which are provided with grooves and one of which is provided with an inwardly disposed flange, a door movable in the frame, a member movably mounted on the door and adapted to enter the groove of that stile having the flange and means mounted on the door for moving said member into the said groove whereby the door is forced edgewise into the groove of the other stile and sidewise into engagement with the said flange.

2. In combination with a door frame having stiles both of which are provided with grooves and one of which is provided with an inwardly disposed flange, a door movable in the frame, a member movably mounted on the door, and terminates short of the upper edge thereof and adapted to enter the groove of that stile having the flange, the last mentioned groove being shorter than the groove in the other stile, and means mounted on the door for moving said member into said groove whereby the door is forced edgewise into the longer groove and sidewise into engagement with the said flange.

3. In combination with a door frame having stiles both of which are provided with grooves and one of which is provided with an inwardly disposed flange, a door movable in the frame, a member movably mounted on the door and adapted to enter the groove of that stile having the flange, a plurality of bell crank levers pivoted on the door and spaced links carried by the levers and connected with the said member, the parts being so arranged that when the member is moved into the groove the door is forced edgewise and sidewise into engagement with the said flange.

In testimony whereof I affix my signature.

GEORGE H. FAHRENBRUCH